(12) United States Patent
Fischer et al.

(10) Patent No.: US 7,994,921 B2
(45) Date of Patent: Aug. 9, 2011

(54) METHOD FOR WIRELESS DATA TRANSMISSION AND A TRANSPONDER

(75) Inventors: Martin Fischer, Pfedelbach (DE);
Ulrich Friedrich, Ellhofen (DE); Jens Masuch, Heilbronn (DE); Michael Pangels, Ludwigsburg (DE); Dirk Ziebertz, Eberstadt (DE)

(73) Assignee: Atmel Corporation, San Jose, CA (US)

( * ) Notice: Subject to any disclaimer, the term of this patent is extended or adjusted under 35 U.S.C. 154(b) by 998 days.

(21) Appl. No.: 11/653,384

(22) Filed: Jan. 16, 2007

(65) Prior Publication Data

US 2007/0176755 A1 Aug. 2, 2007

Related U.S. Application Data

(60) Provisional application No. 60/838,888, filed on Aug. 21, 2006.

(30) Foreign Application Priority Data

Jan. 16, 2006 (DE) ........................ 10 2006 002 514

(51) Int. Cl.
*G08B 13/14* (2006.01)
*G08B 1/08* (2006.01)
*H04Q 5/22* (2006.01)

(52) U.S. Cl. ............... 340/572.4; 340/572.1; 340/572.7; 340/10.1; 340/539.1

(58) Field of Classification Search .... 340/572.1–572.5, 340/572.7, 10.1–10.3, 10.4–10.41, 10.5–10.51, 340/825.58, 10.34, 539.1
See application file for complete search history.

(56) References Cited

U.S. PATENT DOCUMENTS

| | | | |
|---|---|---|---|
| 5,842,118 A | 11/1998 | Wood, Jr. | |
| 6,801,121 B2 * | 10/2004 | Kim et al. | 340/7.1 |
| 2001/0048361 A1 * | 12/2001 | Mays et al. | 340/10.51 |
| 2002/0126013 A1 * | 9/2002 | Bridgelall | 340/572.1 |
| 2003/0119568 A1 * | 6/2003 | Menard | 455/572 |
| 2003/0133435 A1 | 7/2003 | Friedrich | |
| 2004/0205208 A1 * | 10/2004 | Koponen et al. | 709/230 |
| 2005/0053081 A1 * | 3/2005 | Andersson et al. | 370/401 |
| 2005/0237163 A1 | 10/2005 | Lee et al. | |

FOREIGN PATENT DOCUMENTS

| | | |
|---|---|---|
| DE | 195 31 275 A1 | 5/1997 |
| DE | 101 38 217 A1 | 3/2003 |
| WO | WO 2005/109328 A1 | 11/2005 |

OTHER PUBLICATIONS

Klaus Finkenzeller, "RFID Handbook," Fundamentals and Applications in Contactless Smart Cards and Identification, $2^{nd}$ edition, 2003, John Wiley & Sons Ltd.; sections 2.3, 3.2.1, 3.2.1.2, 3.2.2., 4.2.1.1.

* cited by examiner

*Primary Examiner* — Benjamin C Lee
*Assistant Examiner* — Michael Shannon
(74) *Attorney, Agent, or Firm* — Baker Botts L.L.P.

(57) ABSTRACT

A method for wireless data transmission, for example for RFID systems, between a base station and a transponder is provided. For wireless data transmission between a base station and a transponder, data are wirelessly and bidirectionally transmitted between the base station and the transponder through a first interface of a first interface type using a first data transmission protocol, and data are wirelessly and bidirectionally transmitted between the base station and the transponder through at least one second interface of a second interface type using a second data transmission protocol. The first data transmission protocol and the second data transmission protocol correspond at least in part.

19 Claims, 1 Drawing Sheet an a transponder, and to
METHOD FOR WIRELESS DATA TRANSMISSION AND A TRANSPONDER This nonprovisional application claims priority to Provisional Application No. 60/838,888, which was filed on Aug. 21, 2006, and claims priority to German Patent Application No. DE 102006002514.8, which was filed in Germany on Jan. 16, 2006, and which are both herein incorporated by reference.

BACKGROUND OF THE INVENTION

1. Field of the Invention

The present invention relates to a method for wireless data transmission between a base station and a transponder, and to a transponder.

2. Description of the Background Art

Contactless identification systems, or so-called radio frequency identification (RFID) systems typically have a base station or reader (or reader unit) and a plurality of transponders or remote sensors. The transponders and their transmitting and receiving devices customarily do not have an active transmitter for data transmission to the base station. Such non-active systems are called passive systems if they do not have their own energy supply, and semi-passive systems if they have their own energy supply. Passive transponders take the energy they require for their supply from the electromagnetic field emitted by the base station.

For data transmission between the transponder and the base station, the transponder has an interface of a certain interface type, which is compatible with the corresponding interface type of the base station. In a first, rough categorization, the interface types can be divided into contacting and contactless types.

The interface types in which the data transmission takes place in a contactless way are distinguished, among other characteristics, by the operating or carrier frequency used for data transmission, which is to say the frequency transmitted by the base station. Commonly used frequencies include 125 kHz (LF range), 13.56 MHz (RF range), a frequency range between 860 MHz and 960 MHz (UHF range), and a frequency range above 3 GHz (microwave range).

Another distinguishing feature of different interface types is the type of coupling between the respective interfaces of the transponder and base station. In this regard, a distinction is made between what is called inductive or magnetic coupling and what is called far-field coupling, among others. In simplified terms, with inductive or near-field coupling an antenna coil of the base station and an antenna coil of the transponder form a transformer, for which reason this coupling type is also called transformer coupling. In the case of inductive coupling, a maximum separation between the transponder and the base station is limited to the region of a near field of the antennas used. The near field region is primarily determined by the operating frequency of the interface.

Far-field coupling relies on the propagation of electromagnetic waves which are emitted by the antenna used. UHF and microwave systems typically rely on far-field coupling. RF and HF systems, in contrast, typically rely on inductive coupling. Fundamentals in this regard can be found in, for example, the "RFID Handbuch," a textbook by Klaus Finkenzeller, HANSER Verlag, third edition, 2002, section 2.3, "Frequenz, Reichweite Kopplung" (Frequency, Range and Coupling), section 3.2.1, "Induktive Kopplung" (Inductive Coupling), and section 4.2.1.1, "Übergang vom Nah- zum Fernfeld bei Leiterschleifen" (Transition from Near Field to Far Field in Conductive Loops).

In general, load modulation is used to transmit data from a transponder to the base station in the case of inductive coupling; for information on this, refer to Finkenzeller, section 3.2.1.2.1, "Lastmodulation" (Load Modulation), for example.

In general, backscatter coupling is used to transmit data from a transponder to the base station using UHF or microwaves in the far field of the base station. To this end, the base station emits electromagnetic carrier waves, which the transmitting and receiving device in the transponder modulates and reflects appropriately for the data to be transmitted to the base station using a modulation method. The typical modulation methods for this purpose are amplitude modulation, phase modulation and amplitude shift keying (ASK) subcarrier modulation, in which the frequency or the phase position of a subcarrier is changed; in this regard, refer once again to Finkenzeller, section 3.2.2, "elektromagnetische Backscatter-Kopplung" (Electromagnetic Backscatter Coupling).

Data transmission protocols are used for data transmission. A data transmission protocol specifies, for example, an operating frequency, a modulation method, a coding method, data transmission rates, data transmission frame formats, transmission parameters, etc.

Data transmission protocols are typically divided into different layers. One example of this is known as the OSI layer model, with seven data transmission protocol layers. The different layers here are referred to as the physical layer (layer 1), the data link layer (layer 2), the network layer (layer 3), the transport layer (layer 4), the session layer (layer 5), the presentation layer (layer 6), and the application layer (layer 7). For a more detailed description of the OSI model, reference is made to the literature identified above.

In transponders, the data transmission protocols are interface-specific, or in other words, each interface type is assigned its own, proprietary data transmission protocol. Thus, for instance, a transmission protocol for transponders with a UHF interface with far-field coupling in the frequency range of 860 MHz to 960 MHz is described in the proposed standard ISO/IEC_CD 18000-6C dated Jan. 7, 2005. For transponders with an HF interface with inductive coupling with a frequency of 13.56 MHz, a transmission protocol is described in ISO standard 14443. In this context, the data transmission protocols differ significantly across all protocol layers.

In WO 2005/109328 A1, which corresponds to U.S. Publication No. 20050237163, a transponder for so-called remote keyless applications is described which has an active, unidirectional interface for the UHF frequency range and multiple bidirectional interfaces for the LF frequency range. The UHF interface and the relevant LF interfaces use different, proprietary data transmission protocols. Because of the different data transmission protocols, uniform processing within a shared protocol stack of the data that is received or transmitted is not possible.

SUMMARY OF THE INVENTION

It is therefore an object of the present invention to provide a transponder with a first interface of a first interface type, and at least one second interface of a second interface type, and a method for wireless data transmission between a base station and a transponder of this nature, which permit simple and economical implementation of a protocol processor or a protocol stack for the data to be transmitted through the various interfaces.

In the inventive method for wireless data transmission between a base station and a transponder, data are wirelessly and bidirectionally transmitted between the base station and the transponder through a first interface of a first interface type using a first data transmission protocol. In addition to data transmission through the first interface, data are alternately or simultaneously transmitted wirelessly and bidirectionally between the base station and the transponder through at least one second interface of a second interface type using a second data transmission protocol. The first and second interface types can differ based on the frequency used and/or the coupling type, for example. To simplify the protocol processing of the data to be transmitted through the various interface types, the first and second data transmission protocols match at least in part, aside from a modulation method which may in some circumstances be identical.

In an embodiment, symbols that are to be transmitted can be coded in the same manner for the first data transmission protocol and for the second data transmission protocol. The matching coding can concern the coding of symbols that are transmitted from the base station to the transponder, as well as the coding of symbols that are transmitted from the transponder to the base station. Preferred codings are described in the proposed standard ISO/IEC_CD 18000-6C dated Jan. 7, 2005 in section 6.3.1.2.3 and in section 6.3.1.3.2. This allows for identical processing—with the exception of the modulation and the physical transmission—of signals to be transmitted, for example in a common digital front end.

In a further embodiment, data are transmitted in the form of data frames with a header section, which is also referred to as the preamble, and with a middle section and a trailer section. Transmission of this nature can take place from the base station to the transponder or from the transponder to the base station. Transmission parameters can be set with the aid of the header section, wherein transmission parameter settings for the first interface type effect transmission parameter settings for the second interface type. Of course, it is also possible for appropriate transmission parameter settings of the second interface type to effect transmission parameter settings of the first interface type. Such data frames are described in, for example, German patent application DE 10138217, which corresponds to U.S. Publication No. 20030133435, which is incorporated herein by reference. Another example of a transmission parameter setting using a preamble is found in the proposed standard ISO/IEC_CD 18000-6C dated Jan. 7, 2005 in section 6.3.1.2.8. There, coding parameters are set to a binary "0" or a binary "1" in the preamble or header section. It is possible to convert the transmission parameter settings among the different interface types by means of transformation specifications. In this way, uniform transmission parameter setting for both interfaces of the transponder is possible.

In a further embodiment of the method, the first and the second data transmission protocols can correspond in a data link layer. The data link layer here can be layer 2 of the OSI layer model, or can also correspond to a combination of layers 2 through 6 of the OSI layer model.

In a further embodiment, the first and the second data transmission protocols can correspond in an application layer. The application layer here corresponds to layer 7 of the OSI layer model. In this way, a transponder application can be operated independently of the interface type; for example, if interfaces of a certain type are not available in certain countries, the application can be executed transparently through the other interface.

The first interface can be operated in a frequency range from 400 MHz to 6 GHz. A frequency range from 860 MHz to 960 MHz is preferred.

The second interface can be operated in a frequency range from 100 kHz to 150 kHz.

The second interface can be operated in a frequency range from 10 MHz to 20 MHz.

In a further embodiment, the first interface and the second interface can be operated in an identical frequency range, and the first interface can be based on an inductive coupling with the base station while the second interface can be based on a far-field coupling with the base station. In this way, good utilization of an available frequency range is possible through different coupling types.

In a further embodiment, data are transmitted from the transponder to the base station through the first interface and/or the second interface on the basis of backscatter.

Further, the transponder can be supplied with operating power exclusively through the first interface and/or through the second interface, i.e., the transponder is a passive transponder.

The inventive transponder for wireless data transmission with a base station includes a first interface of a first interface type for bidirectional, wireless data transmission with the base station, and at least one second interface of a second interface type for bidirectional, wireless data transmission with the base station. A digital protocol processing unit coupled to the first interface and to the second interface is designed for uniform interface-type-independent processing of the signals received from the first and second interfaces and the signals to be transmitted to said interfaces. During transmission of data, the interfaces perform modulation with a carrier signal, amplification of the modulated signal, and subsequent transmission through an antenna, within the physical layer. When receiving data, the signals received by the antenna are demodulated by the applicable interface and transmitted to the protocol processing unit, which then does not perform any additional interface-type-dependent processing.

The first interface can be designed to operate in a frequency range from 400 MHz to 6 GHz.

The second interface can be designed to operate in a frequency range from 100 kHz to 150 kHz.

The second interface can be designed to operate in a frequency range from 10 MHz to 20 MHz.

In a further embodiment, the first interface and/or the second interface can be designed for backscatter-based transmission of data to the base station.

In a further embodiment, the first interface and/or the second interface can be designed for far-field coupling with the base station.

In a further embodiment, the first interface and/or the second interface can be designed for inductive coupling with the base station.

In a further embodiment, the transponder can be a passive transponder.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
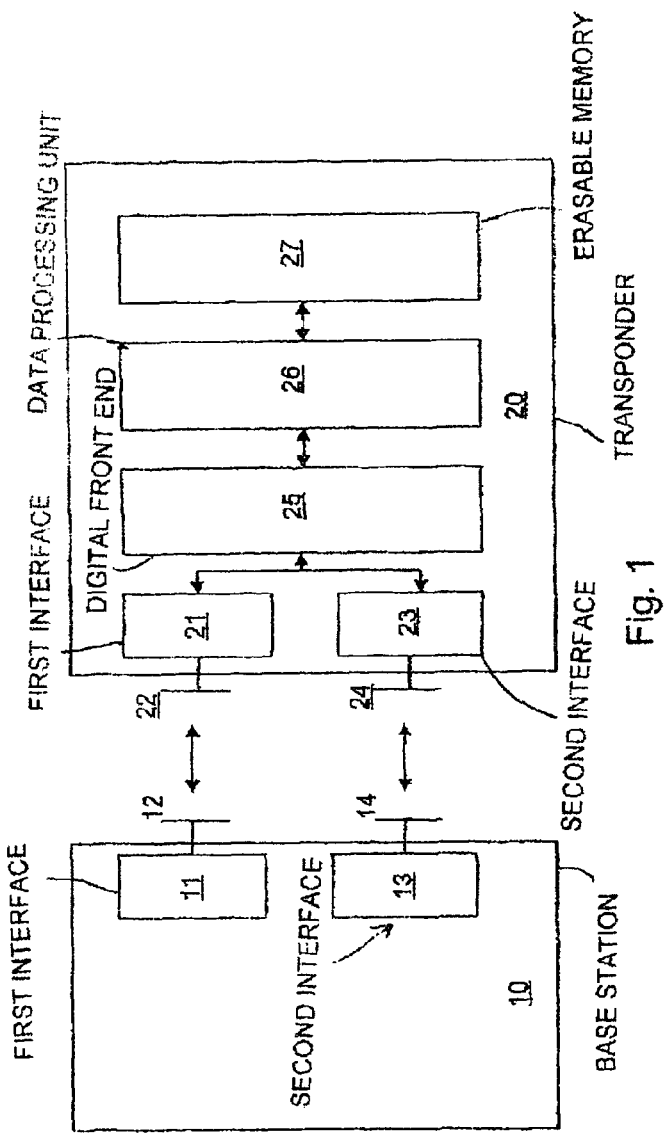
FIG. 1 illustrates an RFID system with a base station and a transponder, according to an embodiment of the present invention.

FIG. 1 shows an RFID system 1 with a base station 10 and a transponder 20.

The base station 10 includes a first interface in the form of an analog front end 11, and an antenna 12 coupled to the analog front end 11. The first interface operates through a far-field coupling in a frequency range from 860 MHz to 960 MHz. The base station 10 additionally includes a second interface in the form of another analog front end 13 and an antenna 14 coupled to the analog front end 13. The second interface operates through an inductive coupling in a frequency range of 13.56 MHz.

The transponder 20 includes a first interface in the form of an analog front end 21 and an antenna 22 coupled to the analog front end 21. The first interface operates through a far-field coupling in a frequency range from 860 MHz to 960 MHz. Data transmission between the base station 10 and the transponder 20 takes place through their respective first interfaces using a data transmission protocol in conformity with the proposed standard ISO/IEC_CD 18000-6C dated Jan. 7, 2005. The transponder 20 additionally includes a second interface in the form of another analog front end 23 and an antenna 24 coupled to the analog front end 23. The second interface operates through an inductive coupling in a frequency range of 13.56 MHz. Data transmission between the base station 10 and the transponder 20 takes place through their respective second interfaces physically, i.e. with a frequency, a modulation method, and signal levels, in accordance with the ISO standard 14443.

Data transmission from the transponder 20 to the base station 10 through the first interface 21 and 22 takes place on the basis of backscatter. Data transmission from the transponder 20 to the base station 10 through the second interface 23 and 24 takes place on the basis of load modulation.

The analog front ends 11, 13, 21 and 23 each include circuit components (not shown), which serve to drive the applicable antennas 12, 14, 22 and 24 and to process signals received by the applicable antennas 12, 14, 22 and 24.

The transponder 20 further includes a digital front end or a digital protocol processing unit 25 coupled to the first interface 21 and 22, and to the second interface 23 and 24. The digital protocol processing unit 25 is designed to uniformly process in an interface-independent manner the signals received from the first interface or the first analog front end 21, and from the second interface or the second analog front end 23, and the signals to be transmitted to the interfaces. To this end, the digital front end 25 includes digital circuits that are not shown, for instance logic gates, counters, timers, etc. The digital front end 25 serves mainly to process the protocol layers below the application layer.

The digital front end 25 is coupled to a data processing unit 26, which can be implemented as a state machine or as a microprocessor, for example. The data processing unit 26 serves to control the function of the transponder 20, and thus implements the application layer in the OSI layer model. For example, the commands transmitted by the base station 10 are processed in the data processing unit 26.

The data processing unit 26 is coupled to an electrically erasable memory 27 that serves to dynamically store transponder application-related data.

An important simplification of the digital protocol processing unit 25 in comparison to a case in which data transmission protocols entirely specific to the interface type are used is achieved through the means that important parts of the data transmission protocol for the first interface, i.e., a protocol in conformity with the proposed standard ISO/IEC_CD 18000-6C dated Jan. 7, 2005, are transferred or adapted to the second interface. As part of the protocol adaptation, the operating frequency, signal level, and backscatter-based data transmission of the transponder, for example, can be adapted to the second interface.

Conformity is then achieved in that symbols to be transmitted are coded in the same manner in both the first and the second data transmission protocols. The matching coding can extend to the transmission of data from the base station 10 to the transponder 20 and/or to the transmission of data from the transponder 20 to the base station 10. In addition, the first and the second data transmission protocols can correspond in a data link layer and/or in an application layer.

Figure 2:
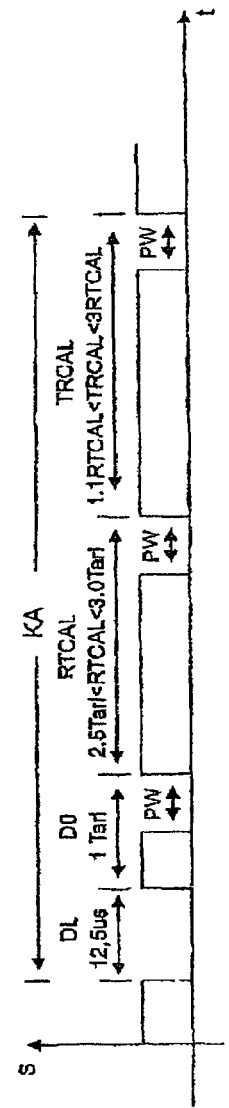
FIG. 2 illustrates a header section of a data frame transmitted by the base station for setting transmission parameters, according to an embodiment of the present invention.

FIG. 2 shows a header section KA of a data frame transmitted by the base station 10 for setting transmission parameters of the first and/or second interface. The preamble or header section KA shown corresponds to the preamble described in the proposed standard ISO/IEC_CD 18000-6C dated Jan. 7, 2005 in section 6.3.1.2.8. The header section is followed by a middle section (not shown) and a trailer section with a frame end marker. The middle section is used for transmitting payload data, which are encoded with the aid of the coding information contained in the header section KA.

The header section KA starts with a delimiter DL, which indicates the start of the frame. The delimiter DL is produced through field suppression or field attenuation of the electromagnetic field emitted by the base station 10 for a period of approximately 12.5 µs.

The delimiter DL is followed by a symbol D0. The symbol D0 is generated by turning on the field and subsequently turning off or attenuating the field for a period PW. The time duration of the symbol D0 corresponds to a pulse-width coding of a binary "0" in the subsequent middle section.

The symbol D0 is followed by the symbol RTCAL. The time duration of the symbol RTCAL is set by the base station 10 such that it is equal to the length of the symbol D0, which is to say a binary "0," plus a time period corresponding to a pulse-width coding of a binary "1" in the subsequent middle section. The transponder measures the time duration of the symbol RTCAL and divides the measured time period by two. Subsequent data or symbols transmitted in the middle section by the base station 10 are interpreted as a binary "0" if their time duration is less than the duration of the symbol RTCAL divided by two, and are interpreted as a binary "1" if their time duration is greater than the duration of the symbol RTCAL divided by two.

The symbol TRCAL is used to set transmission parameters of backscatter-based data transmission from the transponder 20 to the base station 10. Please refer to the proposed standard ISO/IEC_CD 18000-6C dated Jan. 7, 2005 for further functional descriptions.

It is now possible for transmission parameter settings from the header section KA of the transmission protocol of the first interface 21 and 22 to substantially simultaneously effect transmission parameter settings for the second interface, and vice versa, possibly through a transformation or adaptation specification.

The transponder 20 is passive, i.e. it is supplied with operating power exclusively through the first interface 21 and 22 and/or through the second interface 23 and 24.

Of course, additional interfaces of another type can also be provided in the transponder 20 along with the two interfaces 21 and 22, and 23 and 24, shown. Moreover, it is possible for a separate base unit having only one type-specific interface to be provided for each interface type, i.e., it is possible for the transponder 20 to be operated with base stations having only one of the two interface types.

The embodiments shown permit simple and economical implementation of a protocol processor or a protocol stack for a transponder with different physical interface types.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for wireless data transmission between a base station and a transponder, the method comprising:
   transmitting data wirelessly and bidirectionally between the base station and the transponder through a first interface of a first interface type using a first data transmission protocol;
   transmitting the data wirelessly and bidirectionally between the base station and the transponder through at least one second interface of a second interface type using a second data transmission protocol, and
   providing uniform interface-type-independent processing of signals transmitted from the first interface and from the at least one second interface,
   wherein the first and second data transmission protocols have at least a portion which is matching.

2. The method according to claim 1, wherein symbols to be transmitted are coded in the same manner for the first data transmission protocol and for the second data transmission protocol.

3. The method according to claim 1, further comprising the steps of transmitting data in the form of data frames with a header section, a middle section, and a trailer section, and setting transmission parameters with the aid of the header section, wherein transmission parameter settings of the first interface type effect transmission parameter settings of the at least one second interface type.

4. The method according to claim 1, wherein the first and the second data transmission protocols match in a data link layer.

5. The method according to claim 1, wherein the first and the second data transmission protocols match in an application layer.

6. The method according to claim 1, wherein the first interface is operated in a frequency range from 400 MHz to 6 GHz.

7. The method according to claim 1, wherein the at least one second interface is operated in a frequency range from 100 kHz to 150 kHz.

8. The method according to claim 1, wherein the at least one second interface is operated in a frequency range from 10 MHz to 20 MHz.

9. The method according to claim 1, wherein the first interface and the at least one second interface are operated in a substantially identical frequency range.

10. The method according to claim 1, wherein data are transmitted from the transponder to the base station through the first interface and/or the at least one second interface on the basis of backscatter.

11. The method according to claim 1, wherein the transponder is supplied with operating power exclusively through the first interface and/or the at least one second interface.

12. A transponder for wireless data transmission with a base station, the transponder comprising:
    a first interface of a first interface type for bidirectional wireless data transmission with the base station using a first data transmission protocol;
    at least one second interface of a second interface type for bidirectional wireless data transmission with the base station using a second data transmission protocol, wherein the first and second data transmission protocols have at least a portion which is matching; and
    a digital protocol processing unit operably coupled to the first interface and the at least one second interface, which provides for uniform interface-type-independent processing of signals received from the first interface and from the at least one second interface and of signals to be transmitted to the first interface and the at least one second interface.

13. The transponder according to claim 12, wherein the first interface is designed to operate in a frequency range from 400 MHz to 6 GHz.

14. The transponder according to claim 12, wherein the at least one second interface is designed to operate in a frequency range from 100 kHz to 150 kHz.

15. The transponder according to claim 12, wherein the at least one second interface is designed to operate in a frequency range from 10 MHz to 20 MHz.

16. The transponder according to claim 12, wherein the first interface and/or the at least one second interface is/are designed for backscatter based transmission of data to the base station.

17. The transponder according to claim 12, wherein the first interface and/or the at least one second interface is/are designed for far-field coupling with the base station.

18. The transponder according to claim 12, wherein the first interface and/or the at least one second interface are designed for inductive coupling with the base station.

19. The transponder according to claim 12, wherein the transponder is a passive transponder.

* * * * *